United States Patent [19]
Anderson

[11] 4,080,515
[45] Mar. 21, 1978

[54] SUCCESSIVELY ELECTROMAGNETICALLY SCANNED X-Y GRID CONDUCTORS WITH A DIGITIZING SYSTEM UTILIZING A FREE CURSOR OR STYLUS

[75] Inventor: Raymond W. Anderson, Ellicutt City, Md.

[73] Assignee: GTCO Corporation, Rockville, Md.

[21] Appl. No.: 758,818

[22] Filed: Jan. 12, 1977

Related U.S. Application Data

[63] Continuation of Ser. No. 587,615, Jun. 17, 1975, abandoned.

[51] Int. Cl.² ............................................. G08C 21/00
[52] U.S. Cl. ........................................ 178/19; 33/1 M; 340/347 AD; 340/347 M
[58] Field of Search ............. 178/18, 19; 235/61.6 A; 340/347 AD, 347 M; 33/1 M

[56] References Cited

U.S. PATENT DOCUMENTS

| | | | |
|---|---|---|---|
| 3,670,103 | 6/1972 | Baxter et al. | 178/19 |
| 3,801,733 | 4/1974 | Bailey | 178/19 |
| 3,832,693 | 8/1974 | Ishizaki et al. | 178/19 X |
| 3,865,977 | 2/1975 | Hiraki et al. | 178/19 |
| 3,875,331 | 4/1975 | Haselbalg | 178/19 |
| 3,904,822 | 9/1975 | Kamm et al. | 178/19 |

*Primary Examiner*—Thomas J. Sloyan
*Attorney, Agent, or Firm*—John E. Benoit

[57] ABSTRACT

A position digitizing device in which a cursor, moveable within a field generated by successively activated grid wires, developes a voltage from the field and, in conjunction with conditioning circuits, yields the electrical intelligence required to indicate its position with a high degree of precision. Currents are successively passed through parallel grid lines at discretely separate distances, the resultant successively positioned fields successively inducing voltages at the cursor coil output dependent upon the position of the cursor in relation to the actuated grid line. Conditioning equipment to which the cursor output is coupled mixes the cursor output with a reference and introduces circuitry responsive to the rate at which the grid currents are successively stepped to translate the cursor output to a time variant wave form. A reference point developed from that wave form is then used to permit a precision clock to relate the distance of the cursor from a grid line to the time needed to reach the reference point. Cursor position then becomes a function of precisely generated pulses accumulated in a counter.

14 Claims, 13 Drawing Figures

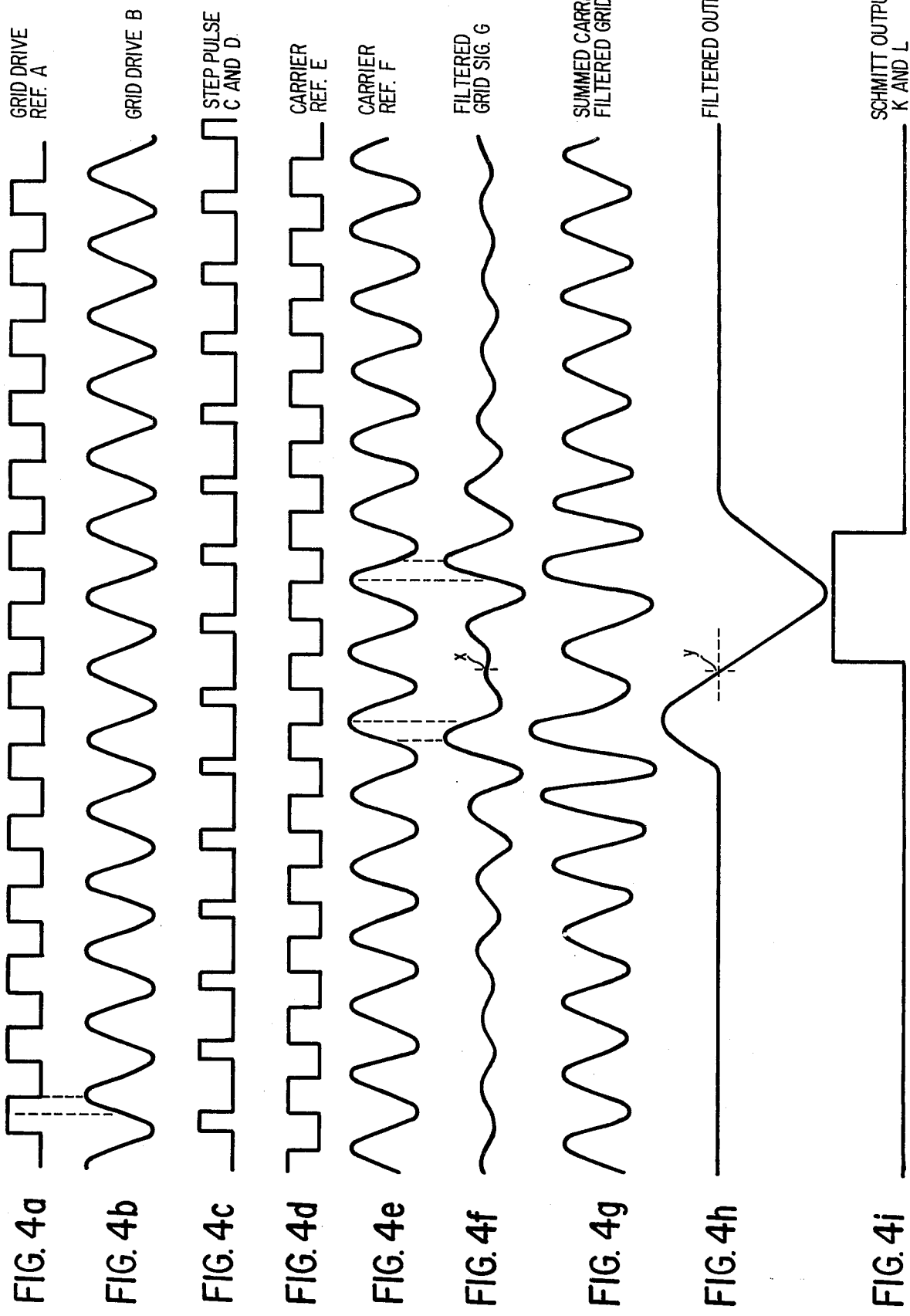

SUCCESSIVELY ELECTROMAGNETICALLY SCANNED X-Y GRID CONDUCTORS WITH A DIGITIZING SYSTEM UTILIZING A FREE CURSOR OR STYLUS

This is a continuation of application Ser. No. 587,615, filed June 17, 1975, now abandoned.

This invention relates generally to the determination of the physical position or coordinate determination on a surface by employing a cursor embodying a coil with relation to a grid of parallel conductors and more specifically to determining the position of the cursor in a continuous linear fashion.

Apparatus for translating the position of a writing instrument into electrical signals for transmission to a remote location such that the position, and corresponding movements, of the writing instrument may be recreated are well known in the art. Thus, drawings, manuscript, or the like may be reproduced at remote locations. Among the more sophisticated prior art devices are those in which movements of the writing instrument in the X and Y coordinates are sensed by electromagnetic means, or the like, and each sensed dimension is translated into a signal capable of transmission. X and Y coordinate positional information derived in the traditional manner may provide inputs to data processing apparatus such as computers, remote data terminate and special systems for processing coordinate data.

One objection to some of the known art apparatus is lack of accuracy to the degree which would be desirable. A number of other problems exist in these known systems. As an example, most of these systems are both amplitude sensitive and phase sensitive which places strict limitations on the inputs to the system. Another problem is that the spacing of the grid lines is extremely critical and very little variation is allowable. Accordingly, manufacture of the grid tablet is relatively expensive. A further problem relates to the criticality of a coil diameter and the necessity of the position of the sensor being substantially parallel to the grid. Yet another problem with the known sensors is the fact that the cursor cannot be removed and replaced during a single operation, but must be initiated from the start if it is so removed.

Accordingly, it is an object of this invention to provide apparatus whereby the position of the cursor can be determined in a continuous linear fashion by using accurate electrical interpretation techniques to determine position between grids.

It is a further object of this invention to provide apparatus wherein the rate of counting is variable, thus providing any resolution desired.

Another object of this invention is to provide an apparatus wherein the accuracy of the output is not wholly dependent upon the scan rate.

Yet another object of the invention is to provide apparatus which is substantially insensitive to amplitude and phase variation.

A still further object of this invention is to provide apparatus wherein the diameter of the cursor coil is not critical.

A still further object of this invention is to provide apparatus wherein some tilt of the cursor coil is permissible.

Another object of this invention is to provide apparatus for obtaining absolute coordinate determination while permitting removal and replacement of the cursor from the grid tablet without re-initiatizing.

These and other objects of the invention will become apparent from the following description taken in conjunction with the drawings wherein FIG. 1 is a block diagram of the basic components of the present invention;

Figure 2:
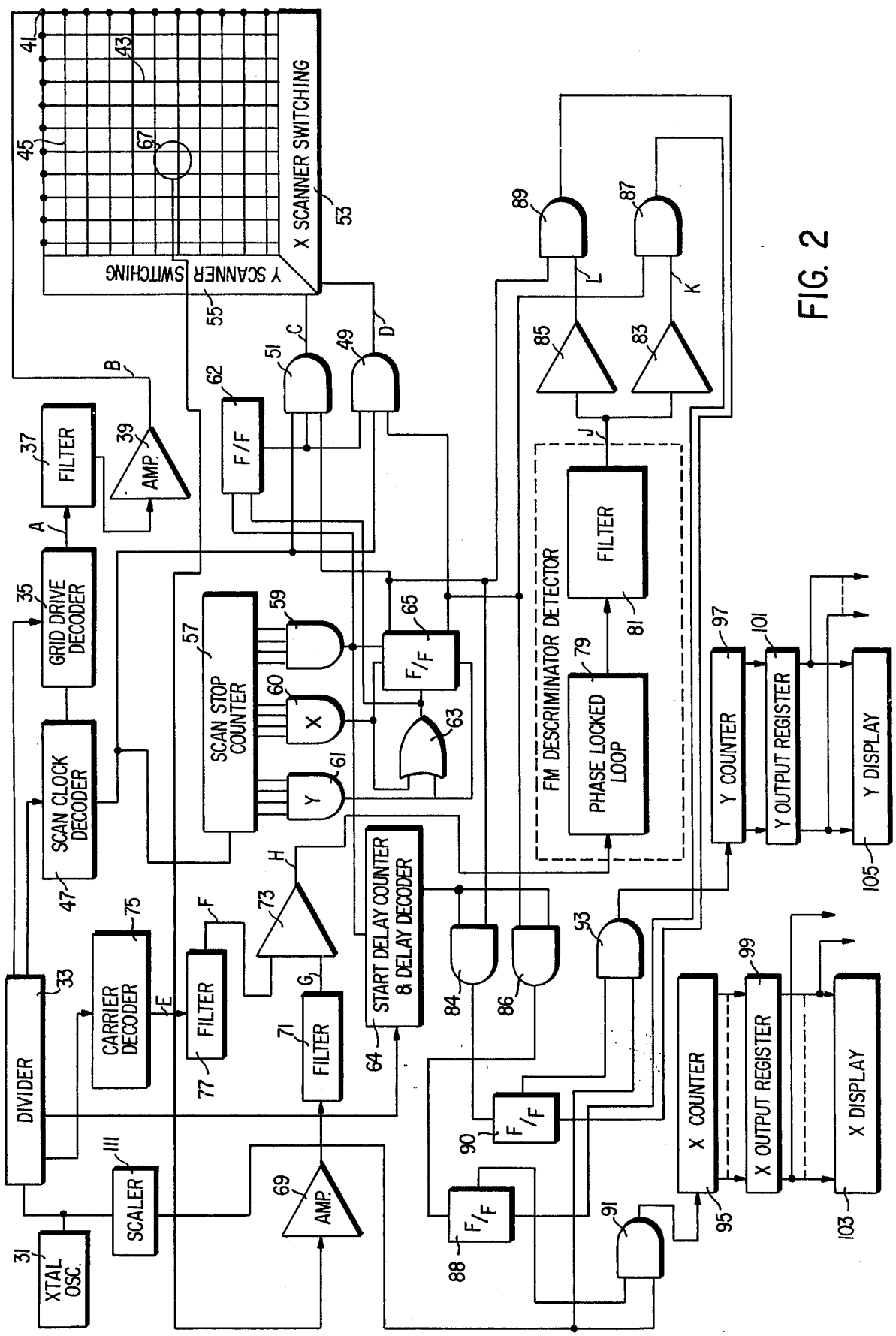
FIG. 2 is a schematic diagram of a preferred embodiment of the present invention.
Figure 5:
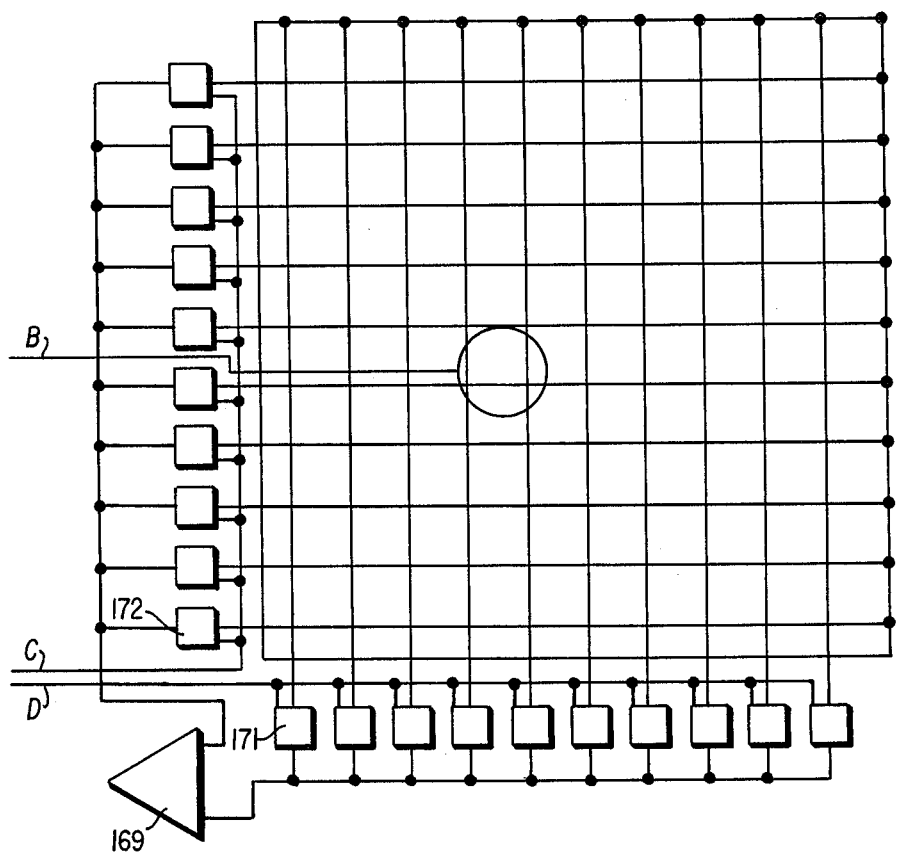

FIGS. 4a–i are graphical representations of the signal outputs at various points in the system of FIG. 2; and FIG. 5 is a partial view of an alternate embodiment of the present invention.

The basic principles of the invention can be broadly described in the context of a typical coordinate digitizing system in which a positioning cursor is moved over a surface with a parallel wire for each axis with the wires perpendicular to the axis.

The main feature of this invention is that a wave, generated by scanning or stepping down the grid in incremental steps, is made to appear to be traveling down the grid at a uniform controlled rate as it passes under the cursor coil. Because this wave can be made to appear to be traveling at a highly uniform rate down the grid, a simple time measurement can be made to determine the position of the cursor over that grid.

This invention uses several well known principles to accomplish this task. They are (1) that when a coil is placed near a conductor conducting an AC signal, the closer the coil is to the conductor, the greater the energy transfer; (2) that when a conductor is excited first on one side of a coil in a given phase and then on the other side, the respective signals picked up by the coil will be 180° out of phase.

A less obvious principle involves detecting a reference level, which is linearily related to time, in the cursor coil signal envelope when a timed or controlled wave, generated by successively activating grid lines is made to pass from one end to the other end of a grid network and therefore from one side to the other side of the cursor coil. In this invention this is accomplished in a unique and linear fashion, by detecting the null in the envelope of the cursor signal each time the grid is scanned. Many conventional methods could be utilized to detect the null in the cursor envelope signal. The current embodiment employs a phase locked loop discriminator technique which yields excellent performance.

Assuming the cursor to be, in electrical essence, a coil, a voltage can be induced in the coil by passing currents through the grid wires. The proximity of the cursor to a grid wire in which current flows will affect the amplitude of the coil output and thus afford a means of measuring the cursor position relative to the subject grid wire. As opposed to the principles used in the present system, alternate systems may require accurate measurement of amplitude, a parameter which is not readily resolved to the high degree of accuracy desirable for a known class of applications. Time, on the other hand, is a parameter which may be resolved to very high degrees of accuracy.

The present invention provides a method of translating the measurement of distance of the cursor from the reference grid wires to a measurement of time to reach an equivalent reference point. Previous methods of accomplishing this end required a continuously moving wave front emanating from the reference point, using accoustic means or elaborate interferometer techniques.

The present invention requires no movement of the reference element, or measurement of field propagations rate. The voltage induced in the coil is amplified and then fed to filtering and demodulation circuitry so arranged that a clearly defined reference level is reached at a time which is a function of the distance of the cursor from the first energized grid line. The process, then, requires the sequential actuation of grid lines by passing a current through them and a measurment of the elapsed time from the start of the activation of the first grid line to the appearance of this reference level at the cursor coil output. The actual timing is developed by a precision oscillator and associated counter. The timing chain itself is used to generate the actuating currents so that all signals are related in an accurately producible pattern. An X-Y scanning system is used, that is, the horizontal position of the cursor is initially determined by scanning the X axis and then the position along the Y axis is similarly determined.

The invention will be explained by first describing the schematic illustration of a preferred embodiment thereof with a subsequent description of the operating characteristics and signal outputs within the system.

Turning now more particularly to the drawings, there is illustrated an oscillator and divider 11 having an input to a grid drive decoder 13 whose output is connected to the grid tablet 15. A further output from the oscillator is connected to a scan clock decoder and counter 17 which is also connected to the grid tablet and controls the sequential scanning thereof. The output of the scan clock decoder and counter is also connected to a detector 21. A further output from the oscillator and divider 11 is connected to a reference signal generator 19.

A cursor 23 detects the signals in the grid which are adjacent to said cursor during a particular scanning sequence. The output of the cursor is connected to a filter 25. The output of the filter 25 is then used to modulate the output of the reference signal generator 19 in modulator 20.

A further output from oscillator divider 11 is provided to X and Y counters 27 and 29. The output of modulator 20 supplies a signal to a detector 21 which in turn integrates the input from oscillator divider 11 to X and Y counters 27 and 29.

FIG. 2 is a schematic diagram of a preferred embodiment of the present invention. The input to the system is supplied by a crystal oscillator 31 having a fixed frequency. The output of the oscillator 31 is coupled to a frequency divider whose division parameter determines the rate of scan.

A first output from the divider 33 is supplied to a grid drive decoder 35 having a square wave output which is passed through a filter 37 and an amplifier 39 so as to provide a sine wave to substantially parallel X and Y grids 43 and 45 at contact 41.

The decoders 35, 47 and 75 all provide square wave outputs with specific phase relationships to each other. One means for providing such decoders would be by the use of gated flip-flops.

A further output from the divider is coupled to scan clock decoder 47 whose output provides one of the inputs to the X shift gate 49 and the Y shift gate 51. The output through these gates determines the scanning mode in either of the X and Y directions.

A further output from the scan clock decoder is coupled to scan stop counter 57. Counter 57 detects both the start and termination of the desired number of counts which have passed from clock decoder 47. The start count is decoded in gate 59 and fed to start delay counter 64 and to start-stop flip flop 62. The stop count is decoded by X and Y gates 60 and 61 which information is supplied to gate 63. The output of gate 63 is coupled to flip flop 62 as a stop signal.

The outputs of gates 60 and 61 are also connected to flip flop 65 to change the state of the flip flop 65.

A further clock signal is provided by divider 33 to a start delay counter and decoder 64 which also has an input from gate 59. Start delay counter and decoder 64 supplies a signal after a predetermined delay. This delay counter is necessary in order to compensate for the delay inherent in the system due to the use of the various filters therein.

Cursor coil 67 detects the signals in the grids at any particular position of the cursor as the X and Y grids are sequentially scanned. Due to the particular design of the grid surface which controls the vertical spacing between the cursor and the grid wires, a signal will be detected by the cursor during the scan several grid lines before and after the cursor as the scan approaches and passes the cursor. Details of the grid surface and cursor will be described later. The output of cursor 67 is passed through an amplifier 69 and a filter 71. As will be discussed later, this provides a filtered grid signal. This signal is supplied to amplifier 73 where it modulates a reference signal provided from divider 33 through carrier decoder 75 and filter 77. In the embodiment shown, filters 37, 71 and 77 are tuned to the same frequency.

The output of amplifier 73 is provided to an FM discriminator or detector comprised of a phase locked loop 79 and a filter 81. In effect, this detector demodulates the signal supplied thereto so as to obtain a signal representation of the position of the cursor. Again, the specific function provided by the discriminator will be explained as the description proceeds.

The output of filter 81 is supplied to Schmitt triggers 83 and 85 which alternately relate to X and Y outputs. The outputs of the Schmitt triggers provide one of the inputs to their respective gates 87 and 89. The other inputs to gates 87 and 89 are provided from the output of flip flop 65.

Both the output of flip flop 65 and the output of start delay counter 64 are provided to a further pair of gates 84 and 86. Gate 84 provides an output which initiates the Y count while gate 86 initiates the X count. These output are supplied to their associated flip flops 88 and 90. The other inputs to the flip flops are the outputs of gate 87 and 89 which stop the X and Y counts.

The output of flip flop 88 is provided to gate 91 for passing the output of crystal oscillator 31 to an X counter 95. In like manner, the output of flip flop 90 is provided to gate 93 so as to pass the output of oscillator 31 to the Y counter 97.

The X and Y counters provide an output to the X and Y output registers 99 and 101 and ultimately to X and Y displays 103 and 105. As indicated by the arrows the outputs of registers 99 and 101 may be provided to other equipment such as computers and the like (not shown). The count in the X and Y counters, when gated in this manner, will represent the position of the cursor.

Figure 1:
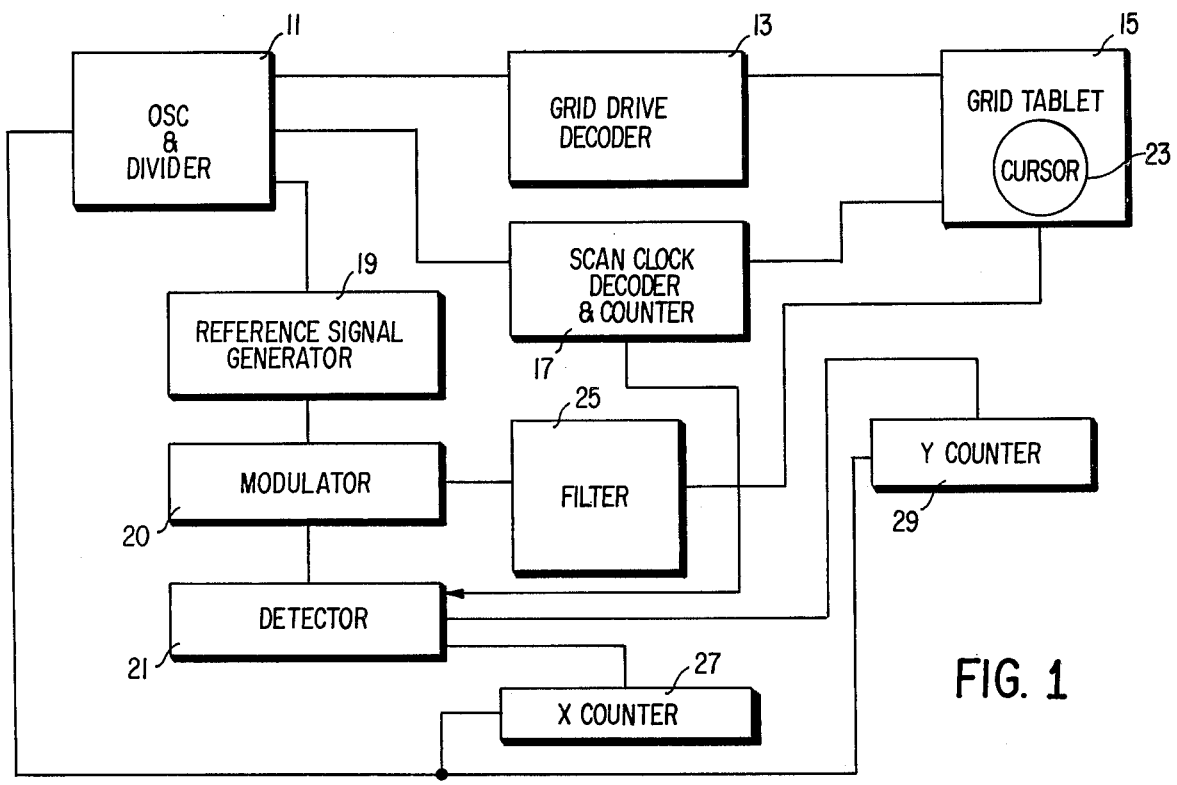
Figure 3:
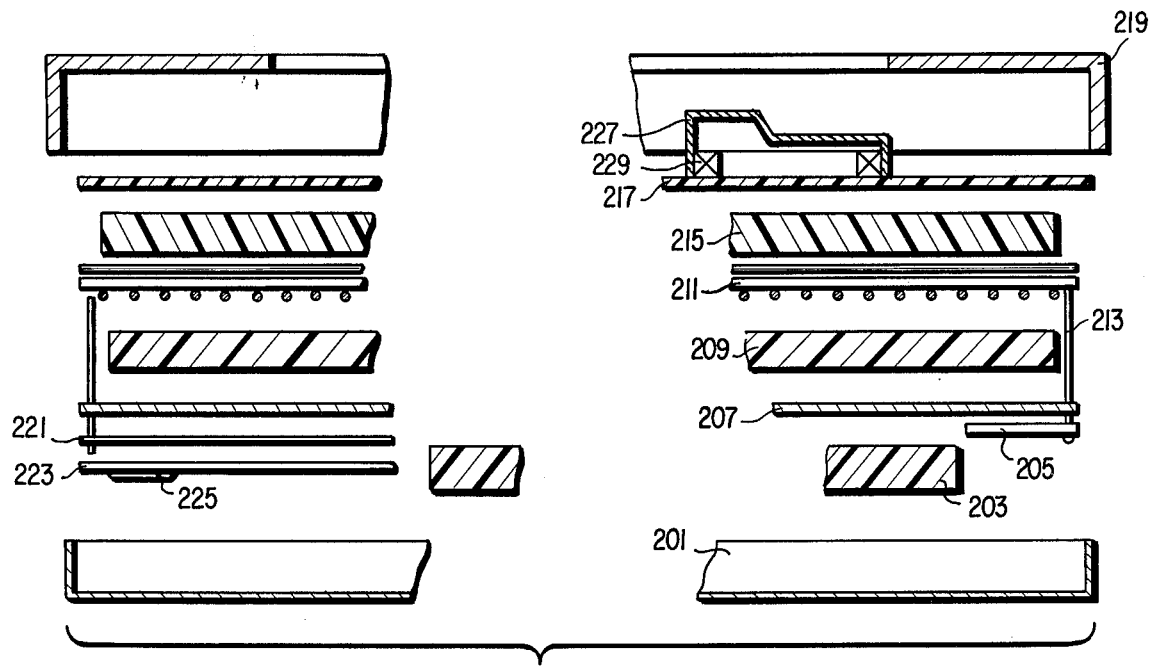
FIG. 3 is an exploded sectional view of the grid board taken along the lines 3—3 of FIG. 2.

FIG. 3 is a cross-sectional view of the grid board with the cursor thereon. It is desireable to have the coil of the cursor spaced from the grid itself. The reasons for this are it reduces the tendency of error due to coil tilt and it tends to integrate over a larger number of grid lines thereby making it easier to linearize.

Although the spacing between the grid and the cursor may be varied, the system operates extremely well when this distance is approximately equal to the spacing between the grid lines.

Referring now specifically to FIG. 3, there is shown a base or bottom cover 201. A non-conductive spacer 203 fits within the base and is of a geometric configuration which permits the insertion of a printed circuit 205 which provides the grid drive common 205. A metal shield 207 is placed above printed circuit 205 and spacer 203 and is, in turn, covered with a further non-conductive spacer 209. The grid board is then placed on the spacer 209 and the grid drive common is connected to the grid base 211 by means of connector 213. As shown, the grid includes the X and Y grid wires above and below the grid base. A further non-conductive spacer 215 is placed on the grid structure. This spacer 215 supports the non-conductive cursor surface 217 on which the cursor 227 and associated coil 229 are moveable. Thus, it can be seen that the distance between the cursor coil and the grid is determined by the thickness of spacer 215. However, it will be obvious that this distance could also be determined by the spacing of the coil 229 within the cursor 227. A top metallic cover 219 is provided about the periphery of the board. This cover provides an edge shielding effect and also prevents the cursor from being moved beyond a predetermined distance from the edge of the board.

The opposite side of the board has identical components, but also includes the switching transistors 225 mounted on a further printed circuit board 223. This requires the use of an insulator 221 between the printed circuit board 223 and shield 207.

Turning now to FIGS. 4a–i there are shown outputs of the system at the various points identified in FIG. 2.

The output of the grid decoder 35, point A, is a square wave constant frequency signal derived from the crystal oscillator and divider. This output is passed through filter 37 and amplifier 39 to produce a sine wave of identical frequency at point B. As indicated by the dashed lines, there is a fixed phase shift due to filter integration. This sine wave is applied to the grid drive common at 41.

The output C and D at either gate 49 or 51 will be a stepped pulse. In the illustration of FIG. 4, the stepped pulse is shown at the same rate as the grid drive. It should be noted that the stepped pulse may be provided at any rate so long as it is an even division of the grid drive rate.

The carrier reference E provided by carrier decoder 75 is a square wave which has the same frequency as the grid drive A with a fixed phase relationship to the grid drive.

The carrier reference F is the filtered output of carrier reference E which produces a sine of the same frequency.

Filtered grid signal G represents the output of the cursor 67. This signal includes the inherent phase shift built in the cursor and filter. Reference signal F is adjusted such that it lags filtered grid signal G by a predetermined amount near 90° up to the time that the scan crosses the center of the cursor, point X, at which it will commence to lead the cursor signal a predetermined amount related to the lag signal. Filtered grid signal G represents a signal which is both amplituded integrated and phase integrated.

The output H of amplifier 73 represents the algebraic sum of the carrier reference signal F and the filtered grid signal G. Frequency modulation occurs in the sense that the cursor signal G, which contains intelligence, is modulating a fixed reference, or steady signal F, which does not contain intelligence, to produce a composite signal which varies in frequency.

The output J from the phase locked loop 70 and filter 81 is the signal representative of the cursor detection during the scan. The center of the cursor is indicated at point Y which is called the zero crossing point. The zero crossing point represents the point of maximum frequency change of the signal as shown in FIG. 4g.

It should be noted that any conventional FM discrimination technique could be used in place of the phase locked loop.

When the filter output J crosses point Y, the point of maximum rate of change, either Schmitt trigger 87 or 89 is triggered so as to produce a stop pulse output at either K or L. These stop pulses are gated to either flip flop 88 or flip flop 90. The outputs of these flip flops close associated gates 93 and 91 which stops the accumulation of the count from the crystal oscillator 31.

If desired, a scaler 111 may be provided between oscillator 31 and the count gates 91 and 93. The scaler 111 is a divider set at any desired scale which changes the absolute value in the counter. This permits selection of different desired scales such as metric, etc.

FIG. 5 is a partial showing of an alternate embodiment wherein the cursor is driven by the grid drive B and the grid is scanned by a series of FET switches 172 and 174 for each grid. The outputs of switches 172 and 174 drive amplifier 169 which is the equivalent of amplifier 69. The scanning is obtained by driving the switches in sequence by the step pulses C and D. The rest of the system remains the same.

It is to be understood that the above description and drawings are illustrative only since equivalent components could be substituted in the system without departing from the invention. Accordingly, the invention is to be limited only by the scope of the following claims.

What is claimed is:

1. Apparatus for determining the position of a selected point on a grid comprising
    an oscillator;
    a cursor including a coil moveable on said grid;
    first means for supplying a signal from said oscillator to X and Y conductors in said grid;
    switching means for scanning said X and Y conductors so as to provide said signal to said conductors individually in sequence;
    said coil in said cursor detecting said signals in said conductors;
    a filter coupled to the output of said coil;
    second means for supplying a reference signal from said oscillator;
    third means for frequency modulating said reference signal with the output of said filter;
    frequency modulation discriminator means coupled to the output of said third means;
    a second filter coupled to the output of said discriminator means for producing a signal envelope each time said conductors are scanned;
    fourth means coupled to the output of said second filter for detecting the zero crossing point of said signal envelope;
    X and Y counters;
    fifth means coupling the output of said fourth means to said counters; and sixth means for coupling the output of said oscillator to said counters;

whereby the outputs of said fourth means and said oscillator are operable to stop each counter at a value indicative of cursor position.

2. The apparatus of claim 1 wherein said oscillator input comprises
a crystal oscillator.

3. The apparatus of claim 1 wherein said first means for supplying said signal comprises
a crystal oscillator;
a divider coupled to the output of said crystal oscillator; and
a decoder and filter coupled to the output of said divider.

4. The apparatus of claim 1 wherein said frequency modulation discriminator means comprises
a phase locked loop.

5. The apparatus of claim 1 wherein said switching means comprises
a clock decoder; and
a counter for detecting the initiation and termination of each scan.

6. The apparatus of claim 1 further comprising
means for positioning said coil a predetermined distance from said grid.

7. Apparatus for determining the position of a selected point on a grid having X and Y conductors comprising an oscillator;
a cursor including a coil moveable on said grid;
first means for supplying a signal from said oscillator to said coil;
switching means for scanning said X and Y conductors in sequence so as to detect the output signal of said coil;
a filter coupled to the output of said switching means;
second means for supplying a reference signal from said oscillator;
third means for frequency modulating said reference signal with the output of said filter;
frequency modulation discriminator means coupled to the output of said third means;
a second filter coupled to the output of said discriminator means for producing a signal envelope each time said conductors are scanned;
fourth means coupled to the output of said second filter for detecting the zero crossing point of said signal envelope;
X and Y counters;
fifth means coupling the output of said fourth means to said counters; and
sixth means for coupling the output of said oscillator to said counters;

whereby the outputs of said fourth means and said oscillator are operable to stop each counter at a value indicative of cursor position.

8. The apparatus of claim 7 wherein said oscillator input comprises
a crystal oscillator.

9. The apparatus of claim 7 wherein said first means for supplying said signal comprises
a crystal oscillator;
a divider coupled to the output of said crystal oscillator; and
a decoder and filter coupled to the output of said divider.

10. The apparatus of claim 7 wherein said frequency modulation discriminator means comprises
a phase locked loop.

11. The apparatus of claim 7 wherein said switching means comprises
a clock decoder; and
a counter for detecting the initiation and termination of each scan.

12. The apparatus of claim 7 further comprising
means for positioning said coil a predetermined distance from said grid.

13. Apparatus for determining the position of a selected point on a grid comprising
an oscillator;
a cursor including a coil moveable on said grid;
means for supplying a signal from said oscillator to X and Y conductors in said grid;
switching means for scanning said X and Y conductors so as to provide said signal to said conductors individually in sequence;
said coil in said cursor developing a signal envelope each time said grid is scanned;
a filter coupled to the output of said coil;
means for supplying a reference signal from said oscillator;
means for frequency modulating said reference signal with the output of said filter;
means for detecting the null in said cursor signal envelope;
means for coupling said modulated output to said means for detecting said null;
X and Y counters;
means for coupling the output of said means for detecting said null to said counters; and
means for coupling the output of said oscillator to said counters;
whereby the outputs from said means for detecting said null and said oscillator are operable to stop each counter at a value indicative of cursor position.

14. The apparatus of claim 13 wherein said means for detecting said null comprises
a phase locked loop discriminator.

* * * * *